Jan. 24, 1967   D. D. GRIMES   3,300,633
UNITARY SERPENTINE TUBULAR LIGHT SOURCE AND
MOUNTING MEANS AND METHOD OF MAKING
Filed Aug. 17, 1964   3 Sheets-Sheet 1
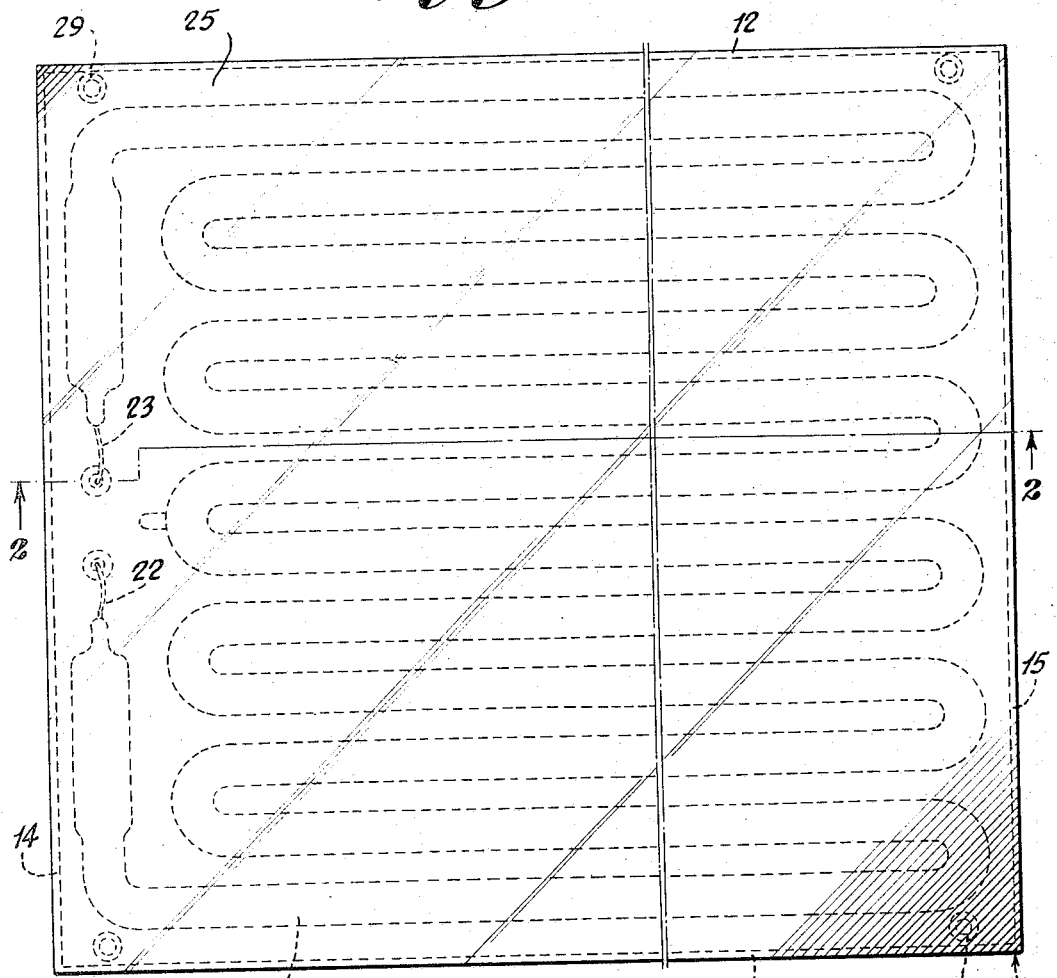
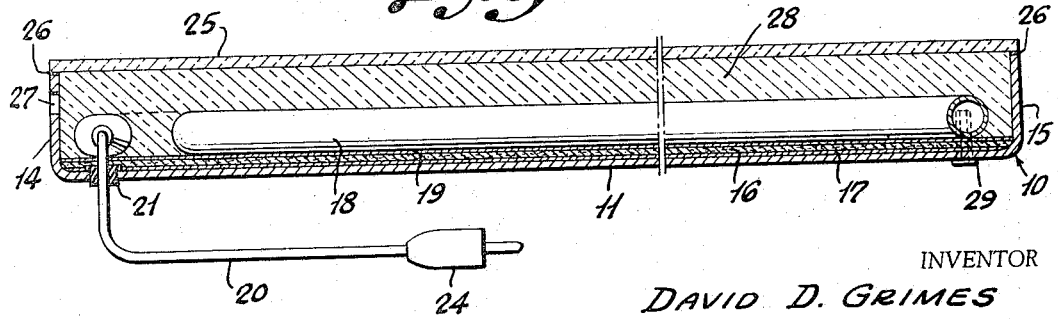
INVENTOR
DAVID D. GRIMES
BY *Glascock, Downing & Seebold*
ATTORNEYS Jan. 24, 1967  D. D. GRIMES  3,300,633
UNITARY SERPENTINE TUBULAR LIGHT SOURCE AND
MOUNTING MEANS AND METHOD OF MAKING
Filed Aug. 17, 1964  3 Sheets-Sheet 2
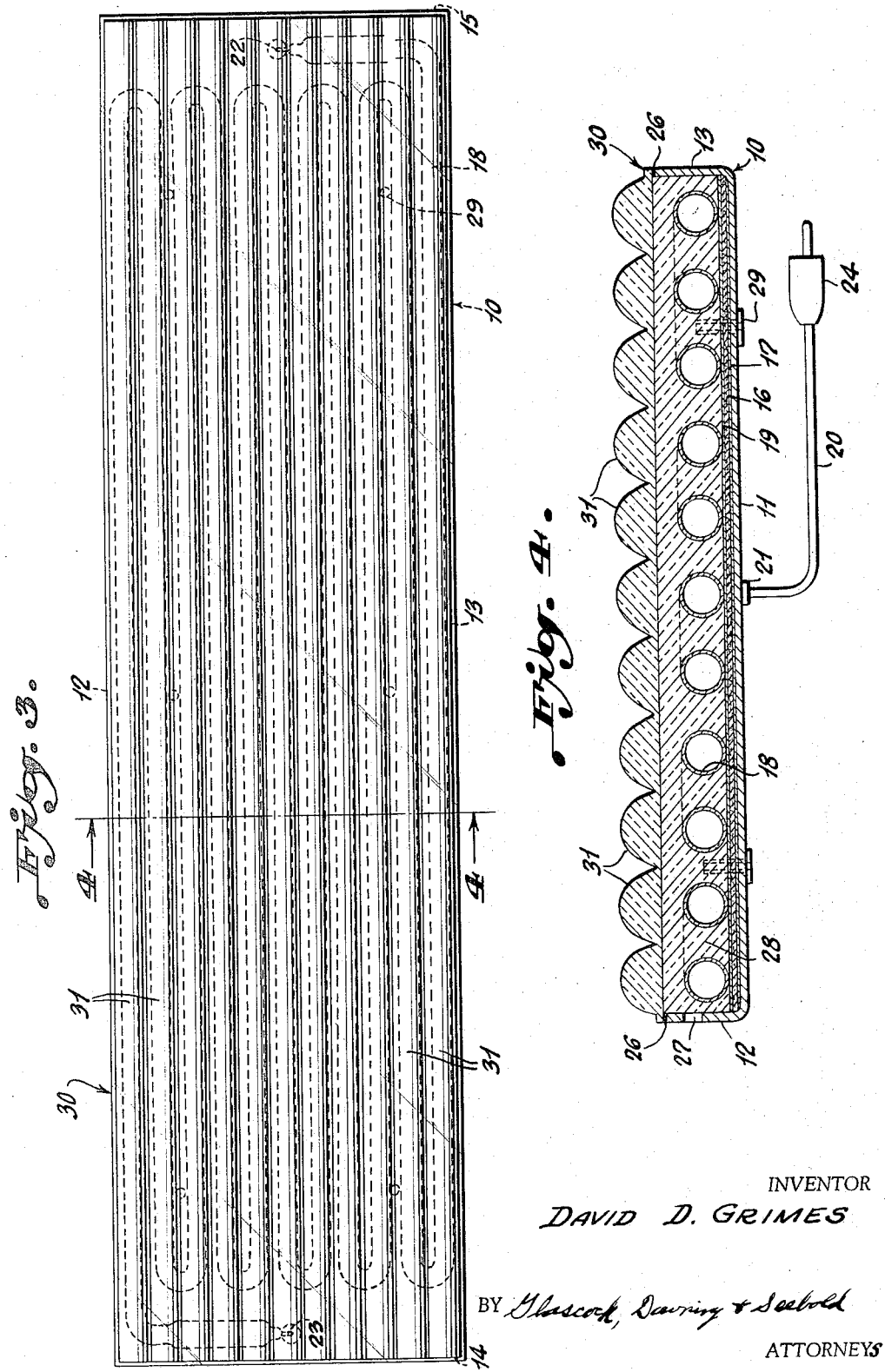
INVENTOR
DAVID D. GRIMES
BY Glascock, Downing & Seebold
ATTORNEYS

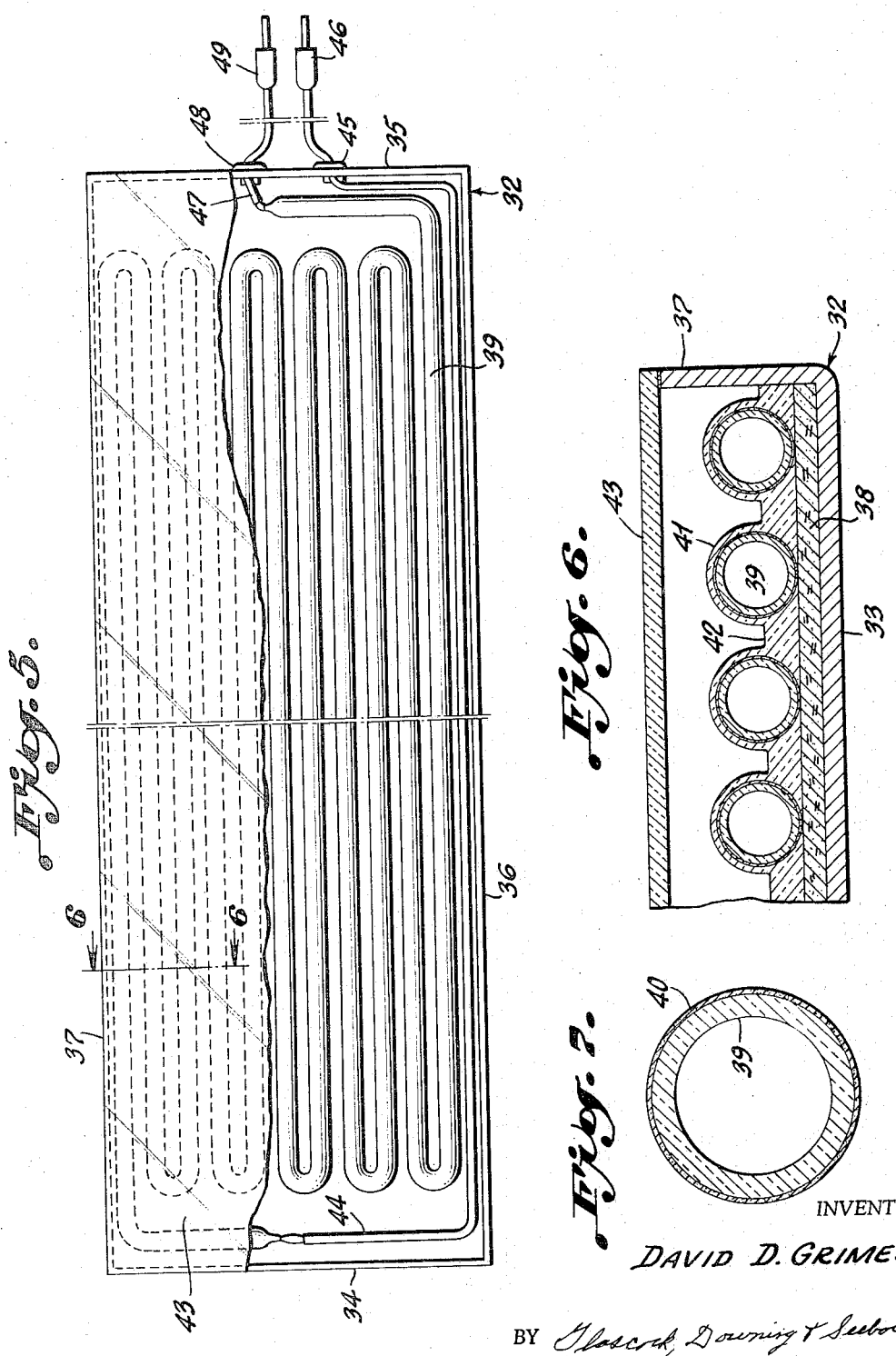

United States Patent Office 3,300,633
Patented Jan. 24, 1967

3,300,633
UNITARY SERPENTINE TUBULAR LIGHT SOURCE AND MOUNTING MEANS AND METHOD OF MAKING
David D. Grimes, Silver Spring, Md., assignor to The Richards Corporation, Arlington, Va., a corporation of Virginia
Filed Aug. 17, 1964, Ser. No. 390,150
9 Claims. (Cl. 240—11.4)

This invention relates to illumination and more particularly to a unitary serpentine tubular light source and mounting means, as well as a method of making the same.

The light source of this invention is primarily intended for use in connection with photo-interpretation equipment, but the same may also be utilized for photo-printing and for other uses. A light source for use in photo-interpretation equipment must be relatively large, in that the light must be uniformally diffused over a relatively wide area and furthermore, any heat emanating from the light source must be adequately dissipated in order to avoid damage to the photographic film being examined. It is common practice in this type of equipment to utilize a light source consisting of straight or serpentine gaseous discharge light tubes and as is well known, such tubes are relatively fragile and must be mounted in a manner to avoid shock or inadvertent contact with the tube which might cause breakage thereof. Since the life of such light tubes, aside from breakage, is extremely long it is entirely practical to completely and permanently enclose the tube in a unitary mounting means and upon ultimate failure of the tube to replace the entire mounting means incoperating the tube therein and, of course, such mounting means must provide adequate protection from shock, must not interfere with light transmission and must also not be subject to deterioration which might gradually and progressively impair light transmission.

Briefly stated, the present invention proposes to solve the above mentioned problems by mounting a serpentine tubular light source in a metallic open top container with a layer of shock absorbing yieldable material between the light tube and the bottom wall of the receptacle, such receptacle being completely filled with a suitable plastic potting compound which is cast in situ to surround the tube and adequately protect the same against damage. The open top of the receptacle is closed and hermetically sealed by a transparent plate of suitable plastic and such plate is applied to the edges of the side and end walls of the receptacle prior to introduction of the potting compound, with the result that the receptacle, together with the closure plate provides a mold for receiving the potting compound which is introduced in a fluid state and thereafter is allowed to set. The potting compound also bonds to the inner surface of the closure plate in order to preclude any possibility of exposing the potting compound to air in the event of a failure of the joint between the closure plate and the edges of the receptacle, since exposure to air might possibly result in deterioration of the potting compound with a consequent reduction in light transmitting properties. Actual tests of units constructed in accordance with this invention have shown that adequate protection is provided for the tubular light source and furthermore, that light transmission and dispersion or diffusion of the same is entirely adequate for the purpose intended.

Furthermore, the metallic receptacle and mounting means therefor permits direct conduction of heat away from the unit which serves to prevent damage to the film being examined due to heat emanating from the light source.

While the above described assembly serves to solve the problems mentioned and is entirely satisfactory for many applications, it has been found that where the unit is subjected to extreme variations in temperature and also where light weight is essential as in airborne installations, that a variation of the above described assembly may be utilized to meet these additional requirements.

In this modified form of the invention it is also proposed to mount a serpentine tubular light source in a metallic open top container with a layer of shock absorbing yieldable material between the light tube and the bottom wall of the receptacle. Prior to installation in the receptacle, the light tube is coated with a suitable primer material and after properly locating the light tube in the receptacle the tube is sprayed or otherwise provided with a relatively thin coating of a suitable plastic potting compound which is also allowed to partially fill the spaces between the sections of the light tube. The primer coat on the light tube provides an adequate bond between the potting compound and the tube and such potting compound also bonds to the layer of yieldable material in the receptacle on which the light tube is disposed. The potting material disposed between the sections of the light tube occupies a space somewhat less than the diameter of the tube.

As in the previously described form of the invention, the open top of the receptacle is closed and hermetically sealed by a transparent plate of suitable plastic and such plate is applied to the edges of the side and end walls of the receptacle and secured thereto by a suitable cement and sealing material. Since the potting compound in contact with the light tube is relatively thin and in the nature of a skin coating, the same does not possess sufficient strength to prevent expansion and contraction of the light tube as a result of variations in temperature and, therefore, the equivalent of a floating mounting for the light tube is provided thereby preventing fracture thereof which might result if expansion and contraction of the tube were prevented by a more or less rigid mounting means. Furthermore, since a relatively small amount of potting compound is utilized the assembly of the modified form of the invention is of materially less weight than the assembly first described above and an incidental advantage is a reduction in cost due to a reduction in use of the potting compound which is relatively costly.

It is accordingly an object of the invention to provide a unitary serpentine tubular light source and mounting means which serves to provide adequate protection from shock or contact with the light tube thereby preventing failure due to breakage.

A further object of the invention is the provision of a unitary serpentine tubular light source and mounting means which serves to provide protection against breakage of the light tube and also provides for adequate transmission of light therefrom over the entire life of the light tube.

A still further object of the invention is the provision of a unitary serpentine tubular light source and mounting means which provides for adequate dissipation of heat emanating from the light tube.

Another object of the invention is the provision of a unitary serpentine tubular light source and mounting means which serves to protect the light tube against breakage and in which any reduction in light transmitting properties due to exposure to air is eliminated.

A further object of the invention is to the provision of a unitary serpentine tubular light source and mounting means in which a plurality of lenses are included as an integral part of the structure in order to diffuse light rays emanating from the tubular light source.

A still further object of the invention is the provision of a modified form of unitary serpentine tubular light source and mounting means which serves to protect the light tube against breakage due to extreme variation in temperature.

Another object of the invention is the provision of a modified form of unitary serpentine tubular light source and mounting means in which the weight of the assembly is reduced to a minimum.

A further object of the invention is the provision of a modified form of unitary serpentine tubular light source and mounting means which serves to prevent impairment of the light transmitting qualities due to deterioration of the material in which the light tube is mounted.

A still further object of the invention is the provision of a method of making a unitary serpentine tubular light source and mounting means.

Further objects and advantages of the invention will be apparent from the following description taken in conjunction with the accompanying drawings wherein:

FIG. 1 is a top plan view of a tubular light source and mounting means constructed in accordance with this invention;

FIG. 2 a sectional view taken substantially on the line 2—2 of FIG. 1;

FIG. 3 a top plan view of a modified form of unitary serpentine tubular light source and mounting means including a plurality of lenses incorporated as an integral part of the structure;

FIG. 4 a sectional view taken substantially on the line 4—4 of FIG. 3;

FIG. 5 a top plan view of a further modified form of unitary serpentine tubular light source and mounting means;

FIG. 6 a fragmentary sectional view to an enlarged scale and taken substantially on the line 6—6 of FIG. 5; and FIG. 7 an enlarged sectional view showing the light tube with a primer coating applied thereto.

With continued reference to the drawings and particularly FIGS. 1 and 2, there is shown a unitary serpentine tubular light source and mounting means constructed in accordance with this invention and which may well comprise a generally rectangular open top, metallic receptacle 10 having a bottom wall 11, sidewalls 12 and 13 and end walls 14 and 15. A sheet of yieldable shock absorbing material 16 is adhesively secured as shown at 17, to the upper surface of the bottom wall 11 and the material of the sheet 16 is of such a character that the upper surface thereof is provided with light reflecting properties.

A serpentine tubular light source in the form of a conventional gaseous discharge tube 18 is adhesively secured to the upper surface of the shock absorbing sheet 16 as shown at 19. An electric power cable 20 may extend through a suitable bushing 21 in the bottom wall 11 of the receptacle 10 and the cable 20 may be connected to conductors 22 and 23 leading from the light tube 18. The cable 20 may also be provided with a conventional plug 24 for insertion in an electrical outlet.

A closure plate 25 of suitable transparent plastic material is disposed over the open top of the receptacle 10 and the closure plate 25 is adhesively secured to the upper edges of the sidewalls 12 and 13 and the end walls 14 and 15 as shown at 26. The light tube 18 is thus mounted in the receptacle 10 and is completely inclosed between the bottom, side and end walls and the cover plate 25 in order to complete the assembly, the receptacle 10 and cover plate 25 attached thereto are utilized as a mold to permit the introduction of a suitable fluid potting compound through one or more apertures 27 in a wall of the receptacle 10 which permits the casting in situ of such a potting compound to completely fill the space within the receptacle 10 in surrounding relationship to the light tube 18 and in initimate contact with the entire surface thereof, except along the lines of contact between the light tube 18 and the shock absorbing sheet 16. The potting compound is allowed to set which provides a transparent body 28 of such compound filling the receptacle 10 and prior to attachment of the cover plate 25 to the receptacle 10, the inner surface of the same is coated with a suitable primer with the result that upon pouring of the potting compound into the receptacle 10 and setting of the same, a bond is provided between the body 28 of potting material and the inner surface of the closure or cover plate 25.

While the adhesive joint 26 between the closure or cover plate 25 and the upper edges of the side and end walls of the receptacle 10 normally precludes the entrance of air, nevertheless, if for some reason the adhesive joint 26 fails, the bond between the body of potting compound 28 and the inner surface of the closure plate 25 will prevent exposure of the body of potting compound 28 to air, thereby precluding any deterioration of the compound which might result in impairment of light transmitting qualities and it is, of course, understood that the potting compound is transparent. It is also to be noted that the potting compound comprising the body 28 in set condition is somewhat yieldable, thereby serving to absorb any distortion of the receptacle 10 which may occur thereby preventing the transmission of such distortion to the light tube 18 which might result in breakage of the same.

In order to provide for mounting of the unitary serpentine tubular light source and mounting means of this invention on associated apparatus or equipment, there may be provided a plurality of tubular inserts 29 extending through the bottom wall 11 of the receptacle 10 and into the body of potting compound 28 and the inserts 29 may be hollow and may, if desired, be internally threaded in order to receive mounting screws or other securing means. Also, if desired, the pouring openings 27 in the sidewall of the receptacle 10 may be closed in any suitable manner after pouring of the potting compound.

With particular reference to FIGS. 3 and 4, a slightly modified form of unitary serpentine tubular light source and mounting means is shown and since the only variation from the form of the invention described above is in the formation of the closure plate for the receptacle, the same reference numerals have been used for corresponding parts as in FIGS. 1 and 2 described above. In this form of the invention, a closure plate 30 of suitable transparent plastic material is provided with a plurality of integral, elongated parallel convex lenses 31 which are precast or otherwise formed in the material of the closure plate 30 and aside from this provision of lenses as an integral part of the closure plate 30, the device disclosed in FIGS. 3 and 4 is the same as that disclosed and described in connection with FIGS. 1 and 2. The lenses 31 may be so designed as to diffuse the light emanating from the light tube 18 in a particular desired manner.

Since the light source and mounting means in both forms of the invention is mounted on the associated apparatus or equipment by means of mounting screws or other securing means directly engaging the inserts in the bottom wall 11 of the receptacle 10 there is provided a direct conduction path for heat generated by the light tube 18 and consequently, such heat is dissipated directly through such conduction paths, rather than being radiated from the unit to the film or other material being examined by means of the light source of this invention. As a consequence, any adverse effect due to heat radiation from the light source is eliminated.

With particular reference to FIGS. 5 to 7 there is shown a still further modified form of the invention which serves to provide a lightweight unit and also serves to prevent breakage of the light tube due to extreme variations in temperature. In this form of the invention there is provided a generally rectangular open top receptacle 32 having a bottom wall 33, end walls 34 and 35 and sidewalls 36 and 37. Disposed on the bottom wall 33 and secured thereto in any desired manner, such as by a suitable adhesive, is a sheet 38 of durable shock absorbing material.

A serpentine tubular light source in the form of a conventional gaseous discharge tube 39 is provided with a coating 40 of a suitable primer and the serpentine tube 39 is disposed in the receptacle 32 in contact with the sheet 38 of yieldable material as clearly shown in FIGS. 5 and 6. Thereafter, the tube 39 is sprayed or otherwise provided with a relatively thin coating 41 of a suitable potting compound and such compound is allowed to fill the spaces between the sections of the tube 39 to a level as indicated at 42 in FIG. 6. As shown in FIG. 6, the height of the potting compound between the sections of the tube 39 is slightly less than the diameter of the tube, but, of course, the thickness of the potting compound in these locations may be varied within reasonable limits. The potting compound is transparent and a portion thereof 41 in contact with the tube 39 and bonded thereto by the primer coating 40 is relatively thin and in effect, provides a thin coating which serves to adequately retain the tube 39 in place in the receptacle 32 but does not provide sufficient strength to prevent expansion and contraction of the tube 39 upon extreme variations in temperature and since such expansion and contraction is not constrained by the potting compound breakage of the tube due to changes in temperature is prevented and furthermore, danger of breakage of the tube 39 due to shock is prevented in the same manner as described above in connection with the other forms of the invention.

The assembly is completed by disposing a transparent plate 43 of suitable plastic material over the top of the receptacle 32 and the plate 43 is bonded to the upper edges of the side and end walls by the use of a suitable adhesive or by other suitable means. In this manner entry of air into the interior of the receptacle 32 is prevented.

Since the quantity of potting compound utilized in this form of the invention is very materially less than that utilized in the other forms of the invention, the weight of the unit is very materially reduced which particularly adapts the same to use in airborne installations or in other applications where light weight is of importance and the use of a smaller quantity of potting compound also serves to materially reduce the cost of the unit since, such potting compound is relatively costly.

In order to provide electrical energy for the light tube 39, an electrical conductor 44 is connected to one end of the tube 39 and the conductor 44 may extend through a suitable bushing 45 in the end wall 35 of the receptacle 32 and terminate in a suitable plug or other type of connector 46. In a similar manner, a second conductor 47 may be connected to the opposite end of the tube 39 and extend through a bushing 48 in the end wall 35 of the receptacle 32 and terminate in a suitable plug or other electrical connector 49. The bushings 45 and 48 serve to relieve strain on the conductors 44 and 47 and these bushings 45 and 48 may also provide a hermetic seal to prevent the entry of air into the interior of the receptacle 32.

It will be seen that by the above described invention there has been provided a particularly simple yet highly effective unitary serpentine tubular light source and mounting means which serve to provide adequate protection against breakage of the light tube, even though the same may be subjected to extreme variations in temperature and, at the same time, precludes any impairment of light transmission qualities due to exposure to air and also serves to eliminate adverse effects due to heat radiation from the light source. The invention in one form also provides an extremely light weight light source which is particularly adapted to airborne installations.

The invention, as described above, also provides a suitable and convenient method of manufacturing the light source of this invention, the practice of which reduces the cost of manufacture to a minimum.

It will be obvious to those skilled in the art that various changes may be made in the invention without departing from the spirit and scope thereof and therefore the invention is not limited by that which is shown in the drawings and described in the specification, but only as indicated in the appended claims.

What is claimed is:

1. A unitary serpentine tubular light source and mounting means comprising a generally rectangular open top metallic receptacle having bottom, side and end walls, a sheet of yieldable shock absorbing material secured to the upper surface of said bottom wall, the upper surface of said sheet having light reflecting properties, a serpentine tubular light source disposed on the upper surface of said sheet and secured thereto, a closure plate of transparent plastic material closing the open top of said receptacle and adhesively secured to the upper edges of said side and end walls, a cast in situ body of transparent plastic compound completely filling said receptacle in intimate contact with substantially the entire surface of said tubular light source and bonded to the inner surface of said plate and means for securing said receptacle to a supporting structure.

2. A unitary serpentine light source and mounting means as defined in claim 1, in which the outer surface of said plate is provided with a plurality of integral elongated, parallel convex lenses.

3. A unitary serpentine light source and mounting means as defined in claim 1, in which the outer surface of said plate is provided with a plurality of integral lenses.

4. A unitary serpentine tubular light source and mounting means comprising a generally rectangular open top receptacle having bottom, side and end walls, a sheet of yieldable shock absorbing material secured to the upper surface of said bottom wall, the upper surface of said sheet having light reflecting properties, a serpentine tubular light source disposed on the upper surface of said sheet and secured thereto, a closure plate of transparent plastic material closing the open top of said receptacle and adhesively secured to the upper edges of said side and end walls, a cast in situ body of transparent plastic compound completely filling said receptacle in intimate contact with substantially the entire surface of said tubular light source and bonded to the inner surface of said plate and means for securing said receptacle to a supporting structure.

5. A unitary serpentine tubular light source and mounting means comprising a generally rectangular open top receptacle having bottom, side and end walls, a sheet of yieldable shock absorbing material secured to the upper surface of said bottom wall, a serpentine tubular light source disposed on the upper surface of said sheet and secured thereto, a closure plate of transparent plastic material closing the open top of said receptacle and adhesively secured to the upper edges of said side and end walls, a cast in situ body of transparent plastic compound completely filling said receptacle in intimate contact with substantially the entire surface of said tubular light source and bonded to the inner surface of said plate and means for securing said receptacle to a supporting structure.

6. A unitary tubular light source and mounting means comprising a generally rectangular open top receptacle having bottom, side and end walls, a sheet of yieldable shock absorbing material secured to the upper surface of said bottom wall, a tubular light source disposed on the upper surface of said sheet and secured thereto, a closure plate of transparent plastic material closing the open top of said receptacle and adhesively secured to the upper edges of said side and end walls, a cast in situ body of transparent plastic compound completely filling said receptacle in intimate contact with substantially the entire surface of said tubular light source and bonded to the inner surface of said plate and means for securing said receptacle to a supporting structure.

7. A unitary serpentine tubular light source and mounting means comprising a generally rectangular open top metallic receptacle having bottom, side and end walls, a sheet of yieldable shock absorbing material secured to the upper surface of said bottom wall, a serpentine tubular light source disposed on the upper surface of said sheet, a primer coating on said tube, a securing coating of transparent plastic compound bonded to said tube and partially filling the spaces between sections of the tube, said securing coating over one-half the circumference of each section of said tube being in the form of a relatively thin skin and a closure plate of transparent plastic material closing the open top of said receptacle and adhesively secured to the upper edges of said side and end walls.

8. A unitary serpentine tubular light source and mounting means comprising a generally rectangular open top metallic receptacle having bottom, side and end walls, a sheet of yieldable shock absorbing material secured to the upper surface of said bottom wall, a serpentine tubular light source disposed on the upper surface of said sheet, a securing coating of transparent plastic compound bonded to said tube and partially filling the spaces between sections of the tube, said securing coating over one-half the circumference of each section of said tube being in the form of a relatively thin skin and a closure plate of transparent plastic material closing the open top of said receptacle and adhesively secured to the upper surface of said side and end walls.

9. A unitary serpentine tubular light source and mounting means comprising a generally rectangular open top receptacle having bottom, side and end walls, a sheet of yieldable shock absorbing material secured to the upper surface of said bottom wall, a serpentine tubular light source disposed on the upper surface of said sheet, means for securing said tube in said receptacle comprising a transparent plastic compound bonded to the entire surface of said tube and to said sheet and a closure plate of transparent plastic material closing the open top of said receptacle and adhesively secured to the upper edges of said side and end walls.

References Cited by the Examiner
UNITED STATES PATENTS 2,337,744 12/1943 Garstang _____ 240—11.4 X
2,726,587 12/1955 Bartley _____ 240—11.4 X JOHN M. HORAN, *Primary Examiner.*

NORTON ANSHER, *Examiner.*

C. R. RHODES, *Assistant Examiner.*